Figure 1:
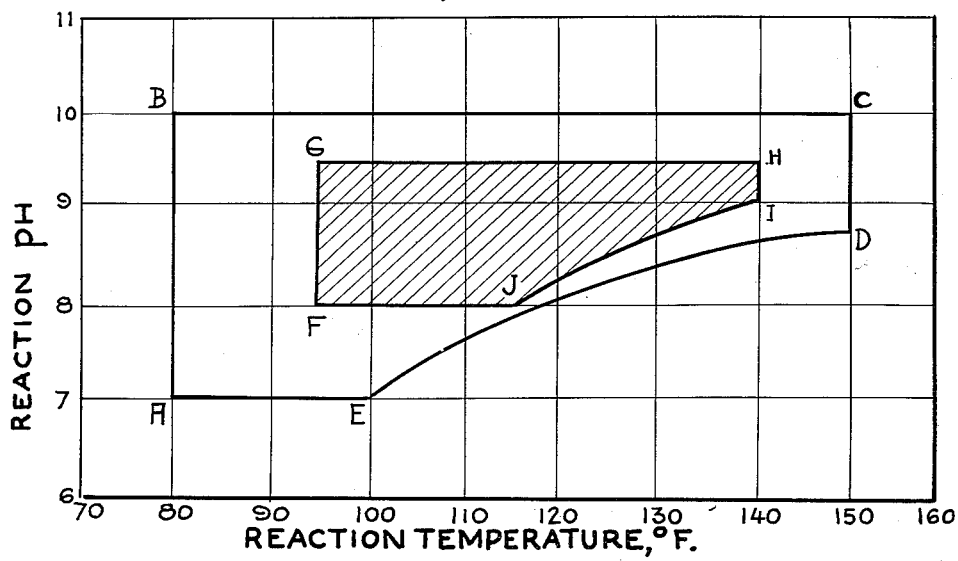

INVENTORS
Robert H. Cramer
BY Edward J. Rosinski
Raymond W. Barclay
ATTORNEY

United States Patent Office 3,042,628
Patented July 3, 1962

3,042,628
PRODUCTION OF ALUMINA AND CATALYST CONTAINING SAME
Robert H. Cramer, Woodbury, and Edward J. Rosinski, Almonesson, N.J., assignors, by mesne assignments, to Engelhard Industries, Inc., Newark, N.J., a corporation of Delaware
Filed Mar. 12, 1958, Ser. No. 721,015
12 Claims. (Cl. 252—465)

This invention relates to the manufacture and use of alumina and alumina-containing materials. More particularly, the present invention is directed to the production of alumina and composites containing alumina obtained from hydrous alumina of particularly designated phase composition.

Alumina is extensively employed in various industries and for a variety of purposes. Thus, alumina has been used as a refractory. In the form of corundum, alumina is known to be useful in the manufacture of ceramic materials. In the petroleum and chemical industries, alumina has been widely used as a catalyst for hydrocarbon conversion operations, as a support for a large number of catalytically active substances and as a drying or dehydrating agent. Alumina has also found wide use in a number of other applications in which the alumina may be mixed or compounded with various materials to produce a large variety of useful products.

Alumina and alumina hydrates, as is well known, may be present in various transitional forms or phases, either as a single phase or as a mixture of two or more phases. Thus, alpha-alumina is a high temperature phase, occurring naturally in rocks, as the mineral corundum. Beta alumina monohydrate or diaspore also occurs abundantly in nature. Alpha alumina monohydrate may be prepared synthetically in various ways, for example by addition of ammonium hydroxide to an aluminum chloride solution. Alpha alumina trihydrate may be prepared by aging alpha alumina monohydrate in a cold basic solution. Beta alumina trihydrate is also formed by aging alpha alumina monohydrate in a cold basic solution but is unstable and gradually is transformed into alpha alumina trihydrate. Chi alumina is obtained upon calcination of alpha alumina trihydrate. Gamma alumina is obtained upon calcination of alpha alumina monohydrate. Eta alumina results from calcination of beta alumina trihydrate. The nomenclature, as used herein, with reference to alumina phase designation is that generally employed in the United States and described in "The Aluminum Industry: Aluminum and Its Production" by Edwards, Frary and Jefferies, published by Mc-Graw-Hill (1930). The various above-designated phases of alumina, including occurrence in nature, preparation, phase transitions, crystal structure, and physical properties, are described in detail in "Alumina Properties" by A. S. Russell et al.; Aluminum Company of America, Pittsburgh, Pa. (1956).

It has heretofore been known that the phase status of alumina employed in a hydrocarbon conversion operation, either as a catalyst component or catalyst support, has a direct bearing on the catalytic characteristics of the alumina so employed with a resulting substantial influence on the extent and nature of the desired catalytic reaction. Thus, it has been recognized that a mixture of eta and gamma alumina is a preferred composition for use as a catalyst base upon which may be deposited, one or more metals or metal compounds appropriate to the catalytic result desired. Gamma alumina is known to result from calcination of alpha alumina monohydrate ($\alpha Al_2O_3 \cdot H_2O$)

Eta alumina, on the other hand, is obtained from calcination of beta alumina trihydrate ($\beta Al_2O_3 \cdot 3H_2O$). Accordingly, alumina in the hydrous state, preferably consists for the above noted purposes, of a mixture of alpha alumina monohydrate and beta alumina trihydrate. It has further been established, by previous workers in the field, that for certain hydrocarbon conversion reactions carried out in the presence of hydrogen such as reforming, hydrocracking, hydrodesulfurization, isomerization and the like, a particularly effective alumina base upon which may be deposited catalytically active metals or metal compounds is one obtained from a hydrous alumina base containing alumina trihydrate admixed with an amount, generally in the range of 5 to 50 percent by weight of alpha alumina monohydrate. Particularly preferred have been hydrous alumina composites having an alpha alumina monohydrate content in the approximate range of 10 to 35 percent by weight and a beta alumina trihydrate content in the approximate range of 65 to 90 percent by weight of total alumina hydrate.

The methods heretofore employed for obtaining hydrous alumina having the above-indicated desirable phase composition of alpha alumina monohydrate and beta alumina trihydrate have involved initial formation of alumina by precipitation from an aluminum salt solution, for example, by addition of ammonium hydroxide to an aqueous solution of aluminum chloride. The alumina precipitate so obtained, composed of a mixture of amorphous oxides that normally dry to alpha alumina monohydrate, was then converted to a mixture in which the trihydrate phases predominated and preferably approximated 65 to 90 percent by weight of the total alumina hydrate composition. The indicated conversion was accomplished either by seeding the alumina precipitate with crystallites of alpha alumina trihydrate (gibbsite) or by aging the alumina precipitate, in aqueous alkaline solution, for an extended time, i.e. 14 days or longer. While the desired admixture of hydrous alumina was obtained by the foregoing procedures, such methods possess several inherent disadvantages, particularly from the standpoint of affording an efficient commercially attractive process which lends itself to a continuous manner of operation. Thus, the conversion step to the desired predominate trihydrate phase utilizing a seeding technique with crystallites of alpha alumina trihydrate (gibbsite) requires a necessary source or preliminary manufacture of such crystallites. The aging technique used for effecting conversion of hydrous alumina, necessarily involves provision of large storage tanks and has the further disadvantage of requiring periodic inspection of the stored alumina slurry over the aging period which normally extends over two weeks or longer. In addition, the hydrous alumina product obtained utilizing the above techniques has required extensive washing and filtration of the alumina to remove impurities, as chloride and ammonium ions, before the same is of sufficient purity to be employed in catalytic operations.

It is accordingly a major object of this invention to provide an improved process for producing hydrous alumina having a phase composition wherein about 5 to about 50 percent by weight and particularly about 10 to about 35 percent by weight of the total alumina hydrate is alpha alumina monohydrate and the remainder of the alumina hydrate composition is alumina trihydrate and principally beta alumina trihydrate. It is a further object of this invention to provide a process for obtaining the aforementioned hydrous alumina phase composition without resorting to a seeding step or an aging step of extremely long duration such as has heretofore been considered a necessary prerequisite. A still further object of the invention is the provision of a process for producing hydrous alumina having the above mentioned desired phase composition obtainable in a form suitable for direct impregnation or otherwise compositing with catalytic quantities of metals or metal compounds without the necessity of first subjecting the hydrous alumina product to extensive washing and filtration to remove impurities therefrom.

The above and other objects which will be apparent to those skilled in the art are achieved in accordance with the process of the present invention wherein hydrous alumina having the desired phase composition of about 5 to about 50 weight percent of alpha alumina monohydrate and about 50 to about 95 percent by weight of alumina trihydrate, predominantly in the form of beta alumina trihydrate, is produced by the reaction of substantially pure aluminum metal having a surface area greater than about 1000 square inches per pound with water in the presence of mercury or a mercury compound at a temperature within the range of 80° F. to 150° F. and a pH between about 7 and about 10 for a period of between about 8 and about 96 hours to convert substantially all of the aluminum metal into hydrous alumina.

One embodiment of the present invention involves a process for the production of hydrous alumina consisting essentially, on a total solids basis, of about 5 to about 50 percent by weight alpha alumina monohydrate and about 50 to about 95 percent of alumina trihydrate, which trihydrate is principally in the form of beta alumina trihydrate but may contain minor proportions of alpha or other alumina trihydrates. The process for producing such hydrous alumina comprises contacting substantially pure aluminum metal in a form having a large exposed surface area, i.e. greater than about 1000 square inches per pound, with an excess of liquid water, in the absence of an acid, and in the presence of metallic mercury or mercury compound in a catalytic amount corresponding to between about $.25 \times 10^{-6}$ and about $100 \times 10^{-6}$ pounds of mercury per square inch of surface of aluminum metal at a temperature in the range of 80° F to 150° F. and at a pH in the range of 7 to 10 for a period of between about 8 and about 96 hours during which period substantially all of the aluminum metal is converted into hydrous alumina having the above designated phase composition.

The process of the invention is advantageous since the precipitate of hydrous alumina containing, on a total solids basis, about 5 to about 50 percent by weight of alpha alumina monohydrate and about 50 to about 95 percent by weight of alumina trihydrate, predominantly in the form of beta trihydrate, is obtained directly without the need for an extended aging step and without the necessity of a step involving seeding of the reaction mixture with crystallites of alpha alumina trihydrate, such as has heretofore been found necessary in preparation of hydrous alumina having the above designated phase composition. The process of the invention has a further advantage in that the precipitate of lumina formed is free from impurities and further if desired, may be directly impregnated with a compound of a metal appropriate to the catalytic effect desired. Thus, the hydrous alumina, obtained in the form of an aqueous slurry, may be directly impregnated with a suitable impregnating solution without undergoing intermediate filtering, washing, drying and/or calcining operations. Alternatively, the hydrous alumina produced in accordance with the above noted process may be filtered and/or dried and thereafter impregnated with a compound of a catalytic metal and subsequently dried and calcined.

In a specific embodiment of the process of the present invention, aluminum metal, in the form of finely divided particles having a surface area greater than about 1000 square inches per pound, is reacted with water in the liquid phase in an amount at least sufficient to cover the aluminum in the presence of mercury or a mercury compound in an amount corresponding to from about $.25 \times 10^{-6}$ to about $10 \times 10^{-6}$ pounds of mercury per square inch of surface of aluminum metal at a temperature within the range of 80° F. to 150° F. and at a pH within the approximate range of 7 to 10 for a period of between about 8 and about 96 hours during which period substantially all of the aluminum metal i.e. greater than 99 percent thereof undergoes conversion into the desired hydrous alumina.

In another embodiment of the present invention, hydrous alumina consisting essentially on a total solids basis of about 5 to about 50 percent and particularly of about 10 to about 35 percent by weight alpha alumina monohydrate, and about 50 to about 95 percent and particularly about 65 to about 90 percent by weight of alumina trihydrate, predominantly in the form of beta alumina trihydrate, is produced by reacting substantially pure aluminum having a surface area greater than about 1000 square inches per pound with a solution of a mercury compound present in an amount corresponding to between about $.25 \times 10^{-6}$ and about $10 \times 10^{-6}$ pounds of mercury per square inch of aluminum metal surface at a temperature within the approximate range of 95° F. to 140° F. and at a pH within the approximate range of 8 to 9.5 for a period not exceeding about 96 hours but sufficient to convert the aluminum metal into hydrous alumina having the above defined phase composition.

In still another embodiment of the invention, substantially pure aluminum metal is covered with a dilute solution of mercuric chloride in an amount corresponding to between about $0.6 \times 10^{-6}$ and about $5 \times 10^{-6}$ pounds of mercuric chloride per square inch of aluminum metal surface under correlated conditions of temperature and pH said temperature being within the range of 80° F. to 150° F. and said pH being within the range of 7 to 10 for a period of between about 8 and about 96 hours to convert substantially all of the aluminum metal into hydrous alumina.

The hydrous alumina obtained in accordance with the present process may be impregnated directly with a solution of a compound of a suitable metal and particularly a metal of group VIA or group VIII of the periodic table. The hydrous alumina obtained in accordance with the present process may further be impregnated with two or more compounds of metals of group VIA or group VIII of the periodic table. The impregnation may be carried out either directly on the produced hydrous alumina in the form of an aqueous slurry or such slurry may be initially filtered and/or dried before the impregating step. After contacting with the impregnating solution under conditions sufficient to deposit a suitable catalytic amount of metal appropriate to the process in which the resulting composite is to be employed, the product is dried and calcined.

The aluminum metal used herein in the production of hydrous alumina is necessarily one of high purity i.e. generally having a purity of at least 99.9 percent. Since the process is capable of affording a slurry of practically pure hydrous alumina consisting essentially on a total hydrous basis of about 5 to about 50 percent by weight alpha alumina monohydrate and about 50 to about 95 percent by weight of alumina trihydrate predominantly in the form of beta trihydrate, it is a preferred embodiment of the invention to affect reaction between aluminum metal having a purity of at least 99.99 percent with substantially pure water such as distilled water to produce a resulting aqueous slurry of high purity hydrous alumina.

The physical form of the aluminum metal determines to a marked degree the rate of reaction between the aluminum and water. Other conditions remaining constant, the higher the surface area of the aluminum exposed to the water, the faster is the rate of reaction. Accordingly, it is generally preferable to use aluminum having a large exposed surface area particularly in the form of pieces having at least one dimension of substantially not more than 0.008 inch. Aluminum in sheet or ribbon form as well as granulated or pelleted aluminum, is also suitable. However, it is generally preferred that the aluminum used have a surface area in excess of 1000 square inches per pound, and usually between about 1000 and 4000 square inches per pound.

Mercury or a mercury compound is necessarily present during the reaction of aluminum and water to accelerate the reaction forming the desired hydrous alumina. It would appear that amalgamated aluminum is formed upon contact of the aluminum with mercury or a mercury compound. The latter upon reaction with aluminum undergoes reduction to metallic mercury. Thus, mercuric chloride reacts with the aluminum to form metallic mercury and aluminum chloride. In similar fashion, mercuric oxide reacts with the aluminum to produce alumina and metallic mercury. When a mixture of mercuric oxide and mercuric chloride is used, the resulting products are alumina, aluminum chloride and metallic mercury. Hydrogen is produced as a by-product of the reaction.

The mercury compound or mercury is generally present in catalytic amounts, generally, corresponding to an amount of mercury of between about $.25 \times 10^{-6}$ and about $100 \times 10^{-6}$ pounds of mercury per square inch of surface of the aluminum metal. Particularly, it is preferred to employ an amount of mercury or mercury compound with respect to the quantity of hydrous alumina produced such that all of the mercury introduced is physically contained by occlusion, adsorption or other means in the resultant alumina slurry. The use of such amounts of mercury or mercury compound corresponding to an amount of mercury of between about $.25 \times 10^{-6}$ and about $10 \times 10^{-6}$ pounds of mercury per square inch of surface of the aluminum metal have been found to be particularly desirable since the necessity of physically settling out mercury from the hydrous alumina product formed such as is essential with the use of much larger quantities of mercury or mercury compound is thereby eliminated.

In addition to metallic mercury, the mercury compound employed is selected from the following group and may be a mixture of two or more of these compounds: mercuric acetate, mercuric bromide, mercuric chloride, mercuric iodide, mercuric fluoride, mercuric nitrate, mercuric oxide, mercuric benzoate, mercuric oxalate, mercurous carbonate, mercuric chlorate, mercurous acetate, mercuric bromate, mercurous bromate, mercurous bromide, mercurous fluoride, mercurous oxide, mercurous sulfate, mercuric sulfate, mercurous nitrate and the like. The above list is not considered exhaustive since it is further contemplated that basic mercuric salts, complexes of mercury compounds, and other inorganic or organic mercury compounds may also be used. Preference, however, is accorded mercuric chloride and particularly dilute aqueous solutions thereof containing an amount of mercuric chloride corresponding to between about $0.6 \times 10^{-6}$ and about $5 \times 10^{-6}$ pounds of mercuric chloride per square inch of surface of the aluminum metal. The use of mercuric chloride has been found to result in formation of amalgamated aluminum at a faster rate than certain other of the mercury compounds tested, permitting use of the above-indicated small amounts. The hydrous alumina obtained, moreover, with the use of the above small amounts of mercuric chloride is substantially free of chlorine.

As indicated above, the velocity of reaction of the aluminum is dependent upon the extent of exposed surface area of the aluminum and also on the amount of mercury or mercury compound present in the reaction mixture. The reaction speed is further dependent on the degree of agitation or the rate at which fresh surfaces of aluminum metal are exposed to contact with the water. It may accordingly be desirable to effect agitation of the reaction mixture forming the hydrous alumina slurry. In some instances, it may be desirable to ball mill the aluminum metal continuously or intermittently in the water containing mercury or mercury compound to thereby expose fresh surface of the aluminum metal to amalgamation and subsequent reaction to alumina.

Temperature and pH of the reaction mixture are other important variables affecting the velocity and course of the reaction between aluminum and water. It is a particular feature of the present invention that the temperature of the reaction mixture forming the hydrous alumina of desired phase composition be closely controlled within the range of 80° F. to 150° F. with maintenance of the pH of the reaction mixture within the range of about 7 to about 10. It is especially preferred to maintain the reaction temperature within the range of 95° F. to 140° F. with a pH of between about 8 and about 9.5. The pH of the reaction mixture may be adjusted by the addition of suitable compounds which do not interfere with the desired course of the reaction, such as for example, aluminum chloride, ammonium hydroxide, ammonium carbonate, urea and the like. The use of volatile compounds such as the ammonia-containing or ammonia-producing compounds will generally be employed when the addition of an additive material is necessary. In FIGURE 1 of the accompanying drawing, the pH of the reaction mixture is plotted against the reaction temperature in degrees Fahrenheit. Referring to this figure, it is a preferred embodiment of the invention to control the temperature of the reaction mixture, in which hydrous alumina of desired phase composition is formed, at between 80° F. and 150° F. and the pH thereof between 7 and 10, said reaction temperature and pH being correlated to lie within the area ABCDE of FIGURE 1. It is a specifically preferred embodiment of the invention to control the reaction temperature to within the range of 95° F. to 140° F. and the reaction pH within the range of 8 to 9.5, which reaction temperature and pH are correlated to lie within the area FGHIJ of FIGURE 1. It has been found that under the aforementioned conditions of temperature and pH that the resulting hydrous alumina of desired phase composition is obtained.

It is another feature of the invention that an excess of water in the liquid phase be present in the reaction mixture for forming the hydrous alumina product. Generally, it is preferred that an amount of water be employed such as to afford a resulting slurry having a solids content of at least 5 percent by weight and generally between about 10 and about 20 percent by weight. A slurry of the latter solids content may, under the conditions of this invention, be directly impregnated with a solution of a metal compound for example, a solution of a compound of a metal of group VIA or group VIII of the periodic table without subjecting the hydrous alumina to an intermediate filtration or drying operation. Impregnation of the hydrous alumina while in the form of such an aqueous slurry assures intimate contact and good mixing between the alumina and impregnating solution leading to a reproducible product of consistently uniform characteristics.

The reaction between water and aluminum is preferably carried out for such period of time until the aluminum is essentially entirely converted to hydrous alumina. Under such conditions, conversion of the aluminum to hydrous alumina is essentially complete and no separation of unreacted aluminum metal from the resulting slurry of hydrous alumina is required. Thus, the alumina formed need not be purified by filtering and water washing. These latter steps are unnecessary since no undesirable foreign non-volatile materials are introduced during the preparation of the alumina. The absence of such undesirable foreign materials in the hydrous alumina product produced is, in fact, a feature of the process of the invention. The reaction conditions are preferably such that the aluminum metal is substantially completely converted to hydrous alumina in a reaction period of between about 8 and about 96 hours and preferably between about 8 and about 30 hours. A small amount of residual metallic mercury to the extent of 0.05 to 0.5% by weight of the alumina may be present after formation of the hydrous alumina slurry. This small amount of mercury is removed during the subsequent drying and/or calcination steps. In some instances, it may be desirable to remove the small amount of mercury from the hydrous alumina slurry before the latter is impregnated with a suitable metal compound by boiling the slurry for 0.5 to 6 hours. Such treatment has been found sufficient to drive off substantially all residual mercury from the hydrous alumina so that the mercury content thereof is less than 100 parts per million. Alternatively, it has been found that substantially all residual mercury may be removed from the hydrous alumina slurry before impregnation thereof by bubbling steam therethrough, generally for a period of from about 0.5 to about 2 hours.

The hydrous alumina so obtained is particularly effective for use as a catalyst component or catalyst support particularly for hydrocarbon conversion reactions carried out in the presence of hydrogen such as reforming, hydrocracking, hydrodesulfurization, isomerization, and the like. Thus, the hydrous alumina may be impregnated or otherwise composited with catalytically active metals or metal compounds particularly those from group VIA and group VIII of the periodic table. The impregnation may take place after drying and/or calcining of the alumina. Alternatively, impregnation of the alumina may be effected after filtration or otherwise concentration thereof. In a preferred embodiment of the invention, the aqueous slurry of hydrous alumina produced may be impregnated directly, particularly when the solids content thereof is between about 10 and about 20 percent by weight. After impregnation, the resulting impregnated product is dried generally at a temperature within the range of 240 to 450° F. for at least 6 hours and up to 24 hours or more with a slow stream of air circulated to carry off the water vapor. The resulting composite may be used as rough granules or the dried material may be ground and utilized as fine powder, or the dried composite may be ground, for example to a particle size of 325 mesh (Tyler) or finer, mulled with water or mixed with a suitable lubricant, such as stearic acid, and formed into pellets.

The granules or pellets so obtained are suitably subjected to high temperature treatment or calcination at a temperature between 650° F. and about 1000° F. for a period of between about 2 and about 36 hours. It is generally preferred that the calcining operation be conducted to minimize contact time of the alumina-containing product with water vapor at the high temperatures encountered. During the drying and calcining steps, the alpha alumina monohydrate component of the hydrous alumina is converted to gamma alumina and the beta alumina trihydrate component of the hydrous alumina is converted to eta alumina. The product after drying generally contains a substantial amount of water, for example, from about 20 to about 50 percent of water, which is driven off at temperatures above 650° F. It is usually preferred to heat the alumina-containing composite at a rate of 1 to 10° F. per minute up to 650° F. with an air flow through the catalyst bed followed by heating at the same rate to the final calcination temperature within the range of 650° F. to 1000° F. While the calcination or heat treatment will generally be conducted in air, it is also feasible although generally less desirable to carry out the same in other oxidizing atmospheres, a reducing atmosphere such as for example, hydrogen or methane or an inert atmosphere, such as nitrogen. In some instances, it may be desirable to carry out the calcination initially in air followed by heat treatment in an atmosphere of hydrogen. Any remaining mercury introduced during the alumina formation and not previously removed, is driven off during the drying and calcination operations and suitably is condensed out of the exit gases. The product of alumina consisting essentially of gamma and eta alumina or such alumina impregnated with one or more catalytically active metals, is finally cooled to yield the finished product.

While the hydrous alumina produced in accordance with the present process may be impregnated either before or after drying with various materials, such alumina has been found to be particularly effective for use as a catalyst base by impregnation thereof with compounds of metals of group VIA and group VIII of the periodic table including, by way of example, compounds of chromium, molybdenum, tungsten, uranium, iron, nickel, cobalt, platinum, palladium, ruthenium, osmium, rhodium and iridium or mixtures of two or more such compounds. Thus, platinum is an effective metal component to be combined with the alumina since composites of platinum and the alumina produced under the conditions of the invention have been found to be very active, particularly when the composite so prepared is to be employed in the reforming of petroleum fractions. With platinum, a preferred method of introduction is to contact the slurry of hydrous alumina produced with a solution of chloroplatinic acid while stirring, and to thereafter pass hydrogen sulfide gas through the slurry with continued stirring, forming platinum sulfide. Another suitable method for introducing platinum into the hydrous alumina slurry is to form a separate aqueous solution of chloroplatinic acid and to introduce hydrogen sulfide gas into the solution until the chloroplatinic acid undergoes no further changes in color upon addition of more hydrogen sulfide. Thus, chloroplatinic acid solution is normally light yellow and upon addition of hydrogen sulfide gas turns to a dark brown color. The brown solution of chloroplatinic acid and hydrogen sulfide may then be combined with the slurry of hydrous alumina. While platinum is preferably combined with the alumina as a solution of chloroplatinic acid, other suitable platinum solutions may be employed including solutions or suspensions of platinum cyanide, platinum sulfide, platinum hydroxide or platinum oxide. In cases where the solution of platinum metal compound or other impregnating compound is not soluble in water, other suitable solvents such as alcohols, ethers, etc. may be used. In addition to platinum, other metals of the platinum family such as palladium may be combined with the alumina in a similar manner using, for example, palladium chloride as the impregnating solution. The hydrous alumina produced in accordance with this invention is also effective as a support or carrier for nickel tungsten sulfide, as well as for chromium and molybdenum. These latter metals may be deposited on the hydrous alumina before or after drying by contact thereof with suitable solutions of chromium or molybdenum-containing compounds. In similar fashion, the hydrous alumina produced in accordance with the present process may be impregnated with nickel, iron or cobalt, or oxides of these metals. A particularly effective catalytic composite comprises alumina, molybdenum oxide and cobalt oxide. Another effective catalytic composite comprises alumina, molybdenum oxide and an oxide of nickel or iron, which composites may also contain cobalt oxide. In preparing such composite, any suitable soluble salt of the metal of the iron group may be employed. For cobalt, a particularly preferred salt is cobalt nitrate, although other soluble salts may be employed including cobalt ammonium chloride, cobalt bromide, cobalt bromate, cobalt ammonium sulfate, cobalt chloride, cobalt chlorate, cobalt iodide, cobalt potassium sulfate and cobalt fluosilicate. Soluble salts of nickel, suitable for use as impregnating solutions include nickel ammonium nitrate, nickel ammonium sulfate, nickel bromide, nickel fluosilicate, nickel chloride, nickel nitride, nickel sulfide and nickel iodide. Soluble iron salts include ferric ammonium sulfate, ferric bromide, ferric nitrate, ferric chloride, ferrous nitrate, ferrous chloride, and ferrous bromide. When compositing two or more metal compounds with the alumina, an impregnating solution comprising the two or more metal compounds may be employed as an impregnating solution or alternatively, the alumina may be initially composited with an impregnating solution of one metal compound, thereafter dried and/or calcined and then composited with a solution of the second metal compound. After impregnation, the resulting composite is dried and calcined as set forth hereinabove. The amount of metal or metal oxide composited with the alumina will depend on a particular metal involved as well as on the intended use of the resulting composite. With metals of the platinum group, the amount of metal composited with the alumina will generally be within the approximate range of 0.01 to 5 percent by weight of the final composite. With metals of the iron group, usually larger amounts will be employed generally between about 0.1 percent to about 20 percent by weight of the final composite. With two or more metal or metal oxides, the total metal composited with the alumina will generally be within the approximate range of 1 percent to 30 percent by weight of the final composite. Thus, with a composite of alumina, molybdenum oxide and cobalt oxide, the final composition will generally contain from about 5 to about 15 percent by weight of molybdenum oxide and from about 0.5 to about 5 percent by weight of cobalt oxide and the remainder alumina.

The following examples will serve to illustrate the invention without limiting the same:

Example 1

Three hundred twenty-seven (327) parts by weight of 0.008 inch aluminum turnings (99.99% pure) having a surface area of about 2600 square inches per pound were contacted with approximately 9300 parts by weight of water containing about 3.1 parts by weight of mercuric chloride. The aluminum turnings were covered with the mercuric chloride solution and the temperature of the reaction mixture was controlled at 131° F. The pH of the reaction mixture was about 8.8. The reaction proceeded for about 15 hours at which time the aluminum was completely reacted. The resulting product was a hydrous alumina slurry containing about 616 parts by weight of alumina, which alumina was composed of about 25 percent by weight of alpha alumina monohydrate and about 73 weight percent of beta aluminum trihydrate and about 2 percent by weight of other alumina trihydrate.

The alumina slurry was slowly contacted with an aqueous solution containing about 520 parts by weight of water and 9.3 parts by weight of chloroplatinic acid while agitating. Thereafter, 810 parts by weight of hydrogen sulfide-water saturated with $H_2S$ at 81° F. were added and the mixture thoroughly agitated. The slurry so treated was then dried in air at 240° F. for 16 hours to give a product of about 68 percent solids. The dried product was ground to a particle size of less than about 325 mesh (Tyler). The ground material was then pelleted using a stearic acid lubricant to make pellets of 1/8″ diameter and 1/16″ height. The resulting pellets were calcined at a temperature of 650 to 920° F. initially in nitrogen and thereafter in air. The final catalytic composite of alumina contained 0.59 weight percent of platinum and 0.75 weight percent of chlorine.

The above catalyst was employed in reforming a Mid-Continent naphtha having a boiling range of 200 to 380° F. The reforming operation was carried out at 500 p.s.i.g. pressure, a liquid hourly space velocity of 2, a hydrogen to hydrocarbon mole ratio of 10. The reforming activity, as measured by the reactor inlet temperature required to yield a 98 octane number product, was 908° F.

Example 2

A catalyst was prepared as in Example 1 with the modification that the temperature of the reaction mixture of aluminum turnings and mercuric chloride was controlled at 150° F. The pH of the reaction mixture remained at 8.8 while the aluminum turnings were completely reacted after about 8 hours. The resulting slurry of hydrous alumina composed of about 70 percent by weight of alpha alumina monohydrate, about 28 percent by weight of beta alumina trihydrate and about 2 percent of other alumina trihydrate was impregnated following the procedure of Example 1 to give a final catalyst of identical composition.

This catalyst was employed in reforming the naphtha charge and under the conditions described in Example 1. The reforming activity, in the case of this catalyst, however, was lower than that of the catalyst of Example 1, requiring a reactor inlet temperature of 926° F. to yield a 98 octane number product.

It will be seen from the above comparative examples that correlation of temperature and pH of the reaction mixture of aluminum turnings and mercuric chloride leading to the formation of alumina in accordance with the teachings of the invention gave rise to a resulting catalyst of substantially improved reforming activity as compared with a catalyst in which the defined correlation was not observed.

The effect of both pH and temperature of the reaction mixture on the alpha alumina monohydrate concentration in a mixture of hydrous alumina phases prepared by reacting amalgamated aluminum with water is shown by the following comparative examples.

Examples 3 to 11 involved reaction of 636 grams of 0.020 inch turnings of 99.99% pure aluminum with 12 liters of 0.000185 molar aqueous solution of mercuric chloride ($HgCl_2$) for a period of 18 to 22 hours under controlled conditions of pH and temperature. The reaction temperature and pH, as well as the composition of the resulting hydrous alumina product obtained, in each instance are set forth in Table I below:

TABLE I

| Example No. | Reaction | | Hydrous Alumina Composition | |
|---|---|---|---|---|
| | Temp., °F. | pH | Percent Alpha $Al_2O.H_2O$ | $Al_2O.3H_2O$ |
| 3 | 98–125 | [1] 6.8–7.5 | 75 | Beta (traces of alpha). |
| 4 | 138–160 | [1] 6.8–7.5 | 83 | Do. |
| 5 | 162–180 | [1] 6.8–7.5 | 100 | Do. |
| 6 | 96–125 | [2] 8.4–9.0 | 43 | Do. |
| 7 | 131–152 | [2] 8.5–8.9 | 70 | Do. |
| 8 | 164–180 | [2] 8.0–8.8 | 90 | Do. |
| 9 | 96–102 | [2] 10–10.3 | 20 | Do. |
| 10 | 137–160 | [2] 9.6–10.3 | 35 | Do. |
| 11 | 162–170 | [2] 9.5–10 | 35 | Do. |

[1] pH controlled with $AlCl_3$ addition.
[2] pH controlled with $NH_4OH$ addition.

It will be seen from the foregoing that the alpha alumina monohydrate concentration of the hydrous alumina composition increased as the temperature increased or as the pH decreased.

Examples 12 to 17 involved reaction of 327 grams of 0.008 inch turnings of 99.99% pure aluminum with 9.3 liters of 0.00123 molar aqueous solution of mercuric chloride ($HgCl_2$) at a pH of 8.6–8.8 under controlled conditions of time and temperature. The reaction temperature and time, as well as the composition of the resulting hydrous alumina product obtained, in each instance are set forth in Table II below:

TABLE II

| Example No. | Reaction Conditions | | Hydrous Alumina Composition | |
|---|---|---|---|---|
| | Temp., °F. | Time, Hrs. | Percent Alpha $Al_2O_3.H_2O$ | $Al_2O_3.3H_2O$ |
| 12 | 60 | 72 | 0 | Mostly beta, Trace Alpha. |
| 13 | 106 | 43 | 15 | Do. |
| 14 | 131 | 15 | 25 | Do. |
| 15 | 120 | 21 | 31 | Do. |
| 16 | 147 | 23 | 66 | Do. |
| 17 | 151 | 8 | 76 | Do. |

It will be seen from the above table as well as from

Figure 2:
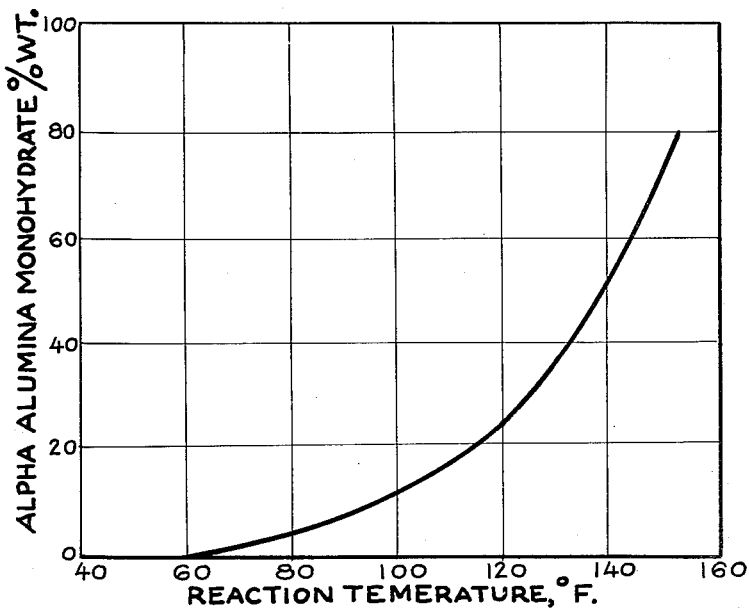

FIGURE 2 of the drawing wherein the content of alpha alumina monohydrate is plotted against reaction temperature in degrees Fahrenheit, that at higher temperatures the reaction was completed in less time and the resulting hydrous alumina product was characterized by a higher content of alpha alumina monohydrate.

EXAMPLE 18

Three hundred twenty seven (327) parts by weight of 0.008 inch aluminum turnings (99.99% pure) having a surface area of 2600 square inches per pound were contacted with approximately 9454 parts by weight of water containing about 1.54 parts by weight of mercuric chloride. The aluminum turnings were covered with the mercuric chloride solution and the temperature of the reaction mixture was controlled at 85° F. The pH of the reaction mixture was about 8.7. The reaction proceeded for about 96 hours at which time the aluminum was completely reacted. The resulting product was a hydrous alumina slurry containing about 615 parts by weight of alumina, which alumina was composed of about 15 percent by weight alpha alumina monohydrate, a minute amount of alpha alumina trihydrate and the remainder beta alumina trihydrate.

The alumina slurry so obtained contained about 6 percent by weight alumina. This slurry was filtered to a product of about 20 percent by weight alumina content. To 1012 grams of this concentrated slurry was added, with stirring, 24.4 cc. of a palladium chloride acidic solution containing .0495 grams of palladium/cc. Stirring was continued for 5 minutes. Three hundred nineteen (319) grams of water saturated with hydrogen sulfide were then added to give 0.77 grams of hydrogen sulfide/gram of palladium. Stirring was continued for an additional 30 minutes.

The impregnated slurry was dried in air for 16 hours at 240° F. The dried product was ground to a particle size of less than about 325 mesh (Tyler), mixed with water and extruded to 1/16" diameter pellets. The resulting pellets were dried 8 hours at 240° F. and thereafter calcined at a temperature of 650 to 925° F. with air flow through the catalyst at 5 volumes per minute per volume of catalyst. The resulting finished catalyst contained 0.64 weight percent palladium, 1.19 weight percent of chlorine, with the remainder alumina.

The above catalytic composite was evaluated for pretreating naphtha to remove nitrogen and sulfur therefrom prior to reforming. The naphtha charge employed was a blend of 83 percent by volume of a Mid-Continent naphtha having a boiling range of 100 to 379° F. and 17 percent by volume of coker naphtha having a boiling range of 93 to 368° F. The evaluation was carried out at a temperature of 675° F., a pressure of 425 p.s.i.g., a liquid hourly space velocity of 5.0 and a hydrogen rate of 500 standard cubic feet per barrel of charge. The results obtained, as regards removal of nitrogen and sulfur, are set forth below:

|  | P.p.m. |
|---|---|
| Nitrogen in charge | 14 |
| Nitrogen in product | <0.2 |
| Sulfur in charge | 695 |
| Sulfur in product | 2 |

*Example 19*

Three hundred twenty seven (327) parts by weight of 0.008 inch aluminum turnings (99.99% pure) having a surface area of 2600 square inches per pound were contacted with approximately 9454 parts by weight of water containing about 1.54 parts by weight of mercuric chloride. The aluminum turnings were covered with the mercuric chloride solution and the temperature of the reaction mixture was controlled at 120° F. The pH of the reaction mixture was about 8.7. The reaction proceeded for about 24 hours at which time the aluminum was completely reacted. The resulting product was a hydrous alumina slurry containing about 615 parts by weight of alumina, which alumina was composed of about 40 percent by weight alpha alumina monohydrate, a minute amount of alpha alumina trihydrate and the remainder beta alumina trihydrate.

The alumina slurry, so obtained, had about 8 percent by weight alumina content. To 7180 grams of this slurry was added, with stirring, 358 cc. of a solution containing 156 grams of molybdenum oxalate and 77.8 grams of cobalt nitrate. The impregnated slurry was then dried in air for 16 hours at 240° F. The dried product was ground to a particle size of less than 325 mesh and mixed with water to extrudable consistency, and extruded to 1/8" diameter pellets. The resulting pellets were dried 8 hours at 240° F. and thereafter calcined by heating the pellets gradually to 925° F. with air flow through the catalyst at 5 volumes per minute per volume of catalyst. The resulting finished catalyst contained 2.7 weight percent of cobalt oxide, 9.9 weight percent of molybdena, with the remainder alumina.

The above catalytic composite was evaluated for pretreating naphtha to remove nitrogen and sulfur therefrom prior to reforming under the same conditions set forth in Example 18. The results obtained are noted below:

|  | P.p.m. |
|---|---|
| Nitrogen in charge | 13 |
| Nitrogen in product | 0.9 |
| Sulfur in charge | 590 |
| Sulfur in product | 4 |

It is to be understood that the above description is merely illustrative of preferred embodiments of the invention of which many variations may be made by those skilled in the art without departing from the spirit thereof.

We claim:

1. A process for producing hydrous alumina consisting essentially, on a total solids basis, of about 5 to about 50 percent by weight alpha alumina monohydrate and about 50 to about 95 percent by weight of alumina trihydrate, predominately in the form of beta alumina trihydrate, which comprises reacting aluminum metal of at least 99.9 percent purity having a surface area greater than about 1000 square inches per pound with excess water, in the absence of acid, and in the presence of a material selected from the group consisting of mercury and a mercury compound present in an amount corresponding to between about $.25 \times 10^{-6}$ and about $100 \times 10^{-6}$ pounds of mercury per square inch of surface of aluminum metal, controlling the temperature of the reaction mixture to within the range of 80° F. to 140° F. and the pH within the range of 7 to 10, the reaction temperature and pH being correlated to lie within the area ABCDE of FIGURE 1 of the accompanying drawing for a period of between about 8 and about 96 hours during which period substantially all of the aluminum metal is converted into said hydrous alumina.

2. A process for producing hydrous alumina consisting essentially, on a total solids basis, of about 10 to about 35 percent by weight alpha alumina monohydrate and about 65 to about 90 percent by weight of alumina trihydrate, predominately in the form of beta alumina trihydrate, which comprises reacting aluminum metal of at least 99.9 percent purity having a surface area greater than about 1000 square inches per pound with excess water, in the absence of acid, and in the presence of a material selected from the group consisting of mercury and a mercury compound present in an amount corresponding to between about $.25 \times 10^{-6}$ and about $10 \times 10^{-6}$ pounds of mercury per square inch of surface of aluminum metal, controlling the temperature of the reaction mixture to within the range of 95° F. to 140° F. and the pH within the range of 8 to 9.5, the reaction temperature and pH being correlated to lie within the area FGHIJ of FIGURE 1 of the accompanying drawing for a period of between about 8 and about 96 hours during which period substantially all of the aluminum metal is converted into said hydrous alumina.

3. A process for producing hydrous alumina consisting essentially, on a total solids basis, of about 5 to about 50 percent by weight alpha alumina monohydrate and about 50 to about 95 percent by weight of alumina trihydrate, predominately in the form of beta alumina trihydrate which comprises reacting aluminum metal of at least 99.9% purity having a surface area greater than about 1000 square inches per pound with excess water, in the absence of acid, and in the presence of between about $0.6 \times 10^{-6}$ and about $5 \times 10^{-6}$ pounds of mercuric chloride per square inch of surface of aluminum metal, controlling the temperature of the reaction mixture to within the range of 80° F. to 140° F. and the pH within the range of 7 to 10, the reaction temperature and pH being correlated to lie within the area ABCDE of FIGURE 1 of the accompanying drawing for a period of between about 8 and about 96 hours during which period substantially all of the aluminum metal is converted into said hydrous alumina.

4. A process for producing hydrous alumina consisting essentially, on a total solids basis, of about 10 to about 35 percent by weight alpha alumina monohydrate and about 65 to about 90 percent by weight of alumina trihydrate, predominately in the form of beta alumina trihydrate which comprises reacting aluminum metal of at least 99.9 percent purity having a surface area greater than about 1000 square inches per pound with excess water, in the absence of acid, and in the presence of between about $0.6 \times 10^{-6}$ and about $5 \times 10^{-6}$ pounds of mercuric chloride per square inch of surface of aluminum metal, controlling the temperature of the reaction mixture to within the range of 95° F. to 140° F. and the pH within the range of 8 to 9.5, the reaction temperature and pH being correlated to lie within the area FGHIJ of FIGURE 1 of the accompanying drawing for a period of between about 8 and about 30 hours during which period substantially all of the aluminum metal is converted into said hydrous alumina.

5. A process for producing hydrous alumina consisting essentially, on a total solids basis, of about 5 to about 50 percent by weight alpha alumina monohydrate and about 50 to about 95 percent by weight of alumina trihydrate, predominately in the form of beta alumina trihydrate, which comprises reacting aluminum metal of at least 99.9 percent purity having a surface area greater than about 1000 square inches per pound with excess water, in the absence of acid, and in the presence of a material selected from the group consisting of mercury and a mercury compound present in an amount corresponding to between about $.25 \times 10^{-6}$ and about $100 \times 10^{-6}$ pounds of mercury per square inch of surface of aluminum metal, controlling the temperature of the reaction mixture to within the range of 80° F. to 140° F. and the pH within the range of 7 to 10, the reaction temperature and pH being correlated to lie within the area ABCDE of FIGURE 1 of the accompanying drawing for a period of between about 8 and about 96 hours during which period substantially all of the aluminum metal is converted into said hydrous alumina, and heating said hydrous alumina to an elevated temperature sufficient to convert the alpha alumina monohydrate component thereof to gamma alumina and the beta alumina trihydrate component thereof to eta alumina.

6. A process for producing hydrous alumina consisting essentially, on a total solids basis, of about 10 to about 35 percent by weight alpha alumina monohydrate and about 65 to about 90 percent by weight of alumina trihydrate, predominately in the form of beta alumina trihydrate, which comprises reacting aluminum metal of at least 99.9 percent purity having a surface area greater than about 1000 square inches per pound with excess water, in the absence of acid, and in the presence of a material selected from the group consisting of mercury and a mercury compound present in an amount corresponding to between about $.25 \times 10^{-6}$ and about $10 \times 10^{-6}$ pounds of mercury per square inch of surface of aluminum metal, controlling the temperature of the reaction mixture to within the range of 95° F. to 140° F. and the pH within the range of 8 to 9.5, the reaction temperature and pH being correlated to lie within the area FGHIJ of FIGURE 1 of the accompanying drawing for a period of between about 8 and about 96 hours during which period substantially all of the aluminum metal is converted into said hydrous alumina, and drying said hydrous alumina at a temperature of between about 240° F. and about 450° F. and thereafter calcining the dried alumina at a temperature between about 650° F. and about 1000° F.

7. A method for manufacturing a catalytic composite consisting essentially of alumina made up of a mixture of gamma alumina and eta alumina and having impregnated thereon, a material selected from the group consisting of metals and oxides of metals of group VIA and group VIII of the periodic table which comprises producing a hydrous alumina, consisting essentially, on a total solids basis, of about 5 to about 50 percent by weight alpha alumina monohydrate and about 50 to about 95 percent by weight of alumina trihydrate, predominately in the form of beta alumina trihydrate, by reacting aluminum metal of at least 99.9 percent purity having a surface area greater than about 1000 square inches per pound with excess water, in the absence of acid, and in the presence of a material selected from the group consisting of mercury and a mercury compound present in an amount corresponding to between about $.25 \times 10^{-6}$ and about $100 \times 10^{-6}$ pounds of mercury per square inch of surface of aluminum metal, controlling the temperature of the reaction mixture to within the range of 80° F. to 140° F. and the pH within the range of 7 to 10, the reaction temperature and pH being correlated to lie within the area ABCDE of FIGURE 1 of the accompanying drawing for a period of between about 8 and about 96 hours, during which period substantially all of the aluminum metal is converted into said hydrous alumina, drying and calcining said hydrous alumina and impregnating the resulting product with a material selected from a metal and an oxide of a metal of group VIA and group VIII of the periodic table.

8. A method for manufacturing a catalytic composite consisting essentially of alumina made up of a mixture of gamma alumina and eta alumina and having impregnated thereon, a material selected from the group consisting of metals and oxides of metals of group VIA and group VIII of the periodic table which comprises producing a hydrous alumina, consisting essentially on a total solids basis of about 5 to about 50 percent by weight alpha alumina monohydrate and about 50 to about 95 percent by weight of alumina trihydrate, predominately in the form of beta alumina trihydrate, by reacting aluminum metal of at least 99.9 percent purity having a surface area greater than about 1000 square inches per pound with excess water, in the absence of acid, and in the presence of a material selected from the group consisting of mercury and a mercury compound present in an amount corresponding to between about $.25 \times 10^{-6}$ and about $100 \times 10^{-6}$ pounds of mercury per square inch of surface of aluminum metal, controlling the temperature of the reaction mixture to within the range of 80° F. to 140° F. and the pH within the range of 7 to 10, the reaction temperature and pH being correlated to lie within the area ABCDE of FIGURE 1 of the accompanying drawing for a period of between about 8 and about 96 hours, during which period substantially all of the aluminum metal is converted into said hydrous alumina, removing the major proportion of water from the resulting aqueous slurry of hydrous alumina, impregnating the resulting product with a material selected from a metal and oxide of a metal of group VIA and group VIII of the periodic table and drying and calcining the resulting impregnated product.

9. A method for manufacture of a catalytic composite consisting essentially of alumina made up of gamma alumina and eta alumina having deposited thereon a material selected from the group consisting of metals and compounds of metals from group VIA and the iron group metals by producing hydrous alumina consisting essentially, on a total solids basis, of about 5 to about 50 percent by weight alpha alumina monohydrate and about 50 to about 95 percent by weight of alumina trihydrate, predominately in the form of beta alumina trihydrate, by reacting aluminum metal of at least 99.9 percent purity having a surface area greater than about 1000 square inches per pound with excess water, in the absence of acid, and in the presence of a material selected from the group consisting of mercury and a mercury compound present in an amount corresponding to between about $.25 \times 10^{-6}$ and about $100 \times 10^{-6}$ pounds of mercury per square inch of surface of aluminum metal, controlling the temperature of the reaction mixture to within the range of 80° F. to 140° F. and the pH within the range of 7 to 10, the reaction temperature and pH being correlated to lie within the area ABCDE of FIGURE 1 of the accompanying drawing for a period of between about 8 and about 96 hours, during which period substantially all of the aluminum metal is converted into said hydrous alumina, contacting the hydrous alumina slurry so obtained without intermediate washing, filtration or drying thereof with a solution of a compound of a metal selected from group VIA and the iron group metals of the periodic table and thereafter drying and calcining the resulting product.

10. A method for manufacture of a catalytic composite consisting essentially of alumina made up of gamma and eta alumina and having deposited thereon a minor proportion of palladium which comprises producing hydrous alumina consisting essentially, on a total solids basis, of about 5 to about 50 percent by weight alpha alumina monohydrate and about 50 to about 95 percent by weight of alumina trihydrate, predominately in the form of beta alumina trihydrate, by reacting aluminum metal of at least 99.9 percent purity having a surface area greater than about 1000 square inches per pound with excess water, in the absence of acid, and in the presence of a material selected from the group consisting of mercury and a mercury compound present in an amount corresponding to between about $.25 \times 10^{-6}$ and about $100 \times 10^{-6}$ pounds of mercury per square inch of surface of aluminum metal, controlling the temperature of the reaction mixture to within the range of 80° F. to 140° F. and the pH within the range of 7 to 10, the reaction temperature and pH being correlated to lie within the area ABCDE of FIGURE 1 of the accompanying drawing for a period of between about 8 and about 96 hours during which period substantially all of the aluminum metal is converted into said hydrous alumina, contacting the hydrous alumina slurry so obtained without intermediate washing, filtration or drying thereof with a solution of a palladium compound and thereafter drying and calcining the resulting product.

11. A method for manufacture of a catalytic composite consisting essentially of alumina made up of gamma alumina and eta alumina having deposited thereon a minor proportion of cobalt oxide which comprises producing hydrous alumina consisting essentially, on a total solids basis, of about 5 to about 50 percent by weight alpha alumina monohydrate and about 50 to about 95 percent by weight of alumina trihydrate, predominately in the form of beta alumina trihydrate, by reacting aluminum metal of at least 99.9 percent purity having a surface area greater than about 1000 square inches per pound with excess water, in the absence of acid, and in the presence of a material selected from the group consisting of mercury and a mercury compound present in an amount corresponding to between about $.25 \times 10^{-6}$ and about $100 \times 10^{-6}$ pounds of mercury per square inch of surface of aluminum metal, controlling the temperature of the reaction mixture to within the range of 80° F. to 140° F. and the pH within the range of 7 to 10, the reaction temperature and pH being correlated to lie within the area ABCDE of FIGURE 1 of the accompanying drawing for a period of between about 8 and about 96 hours during which period substantially all of the aluminum metal is converted into said hydrous alumina, contacting the hydrous alumina slurry so obtained without intermediate washing, filtration or drying thereof with a solution of a cobalt compound and thereafter drying and calcining the resulting product.

12. A method for manufacture of a catalytic composite consisting essentially of alumina made up of gamma alumina and eta alumina having deposited thereon a minor proportion of molybdenum oxide which comprises producing hydrous alumina consisting essentially, on a total solids basis, of about 5 to about 50 percent by weight alpha alumina monohydrate and about 50 to about 95 percent by weight of alumina trihydrate, predominately in the form of beta alumina trihydrate, by reacting aluminum metal of at least 99.9 percent purity having a surface area greater than about 1000 square inches per pound with excess water, in the absence of acid, and in the presence of a material selected from the group consisting of mercury and a mercury compound present in an amount corresponding to between about $.25 \times 10^{-6}$ and about $100 \times 10^{-6}$ pounds of mercury per square inch of surface of aluminum metal, controlling the temperature of the reaction mixture to within the range of 80° F. to 140° F. and the pH within the range of 7 to 10, the reaction temperature and pH being correlated to lie within the area ABCDE of FIGURE 1 of the accompanying drawing for a period of between about 8 and about 96 hours during which period substantially all of the aluminum metal is converted into said hydrous alumina, contacting the hydrous alumina slurry so obtained without intermediate washing, filtration or drying thereof with a solution of a molybdenum compound and thereafter drying and calcining the resulting product.

References Cited in the file of this patent

UNITED STATES PATENTS

| Re. 22,196 | Heard | Oct. 6, 1942 |
| 2,371,237 | Heard | Mar. 13, 1945 |
| 2,449,847 | Heard | Sept. 21, 1948 |
| 2,758,011 | Bloch | Aug. 7, 1956 |
| 2,855,275 | Hervert | Oct. 7, 1958 |
| 2,872,418 | Hervert et al. | Feb. 3, 1959 |